Feb. 16, 1932.                E. R. LLEWELLYN                1,845,428
                              SCREW THREAD LOCK
                            Filed June 30, 1930
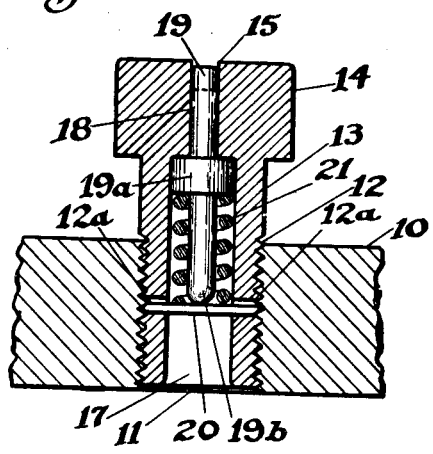
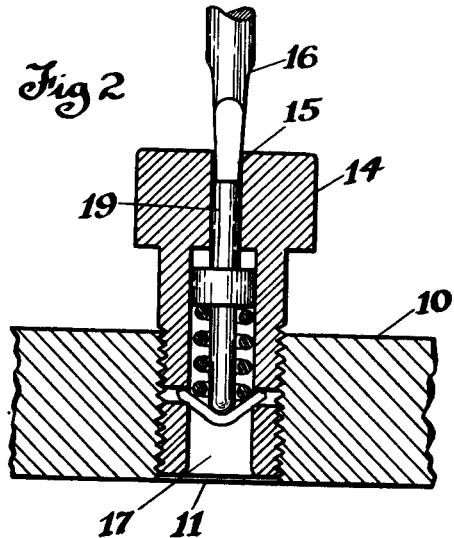
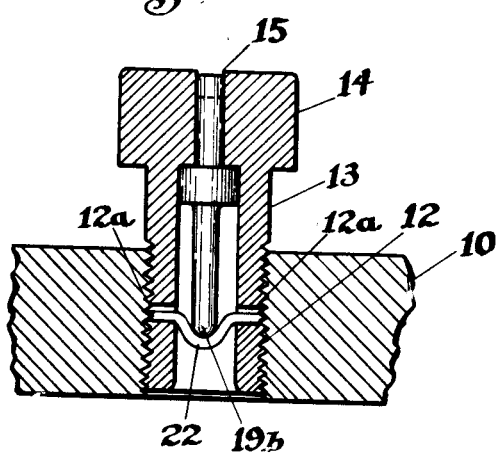
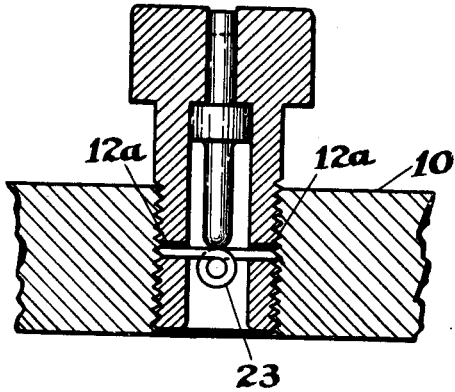
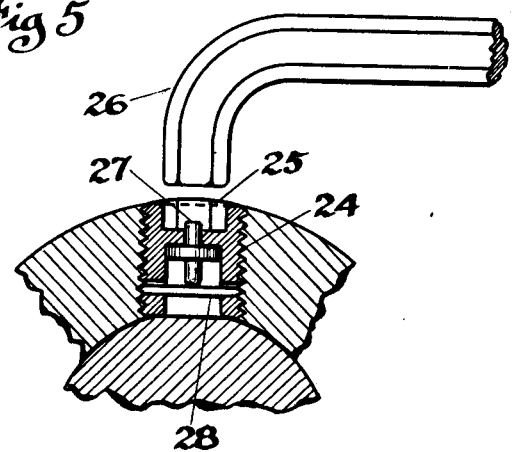
Inventor
Ernest R. Llewellyn Patented Feb. 16, 1932

1,845,428

UNITED STATES PATENT OFFICE

ERNEST R. LLEWELLYN, OF ARLINGTON, MASSACHUSETTS, ASSIGNOR TO THE HENDEY MACHINE COMPANY, OF TORRINGTON, CONNECTICUT, A CORPORATION OF CONNECTICUT

SCREW THREAD LOCK

Application filed June 30, 1930. Serial No. 465,052.

This invention relates to screw threads and more particularly to means for preventing relative rotary motion between two threaded members, and while not limited thereto is particularly adapted to locking an externally threaded screw in an internally threaded member.

It is well known that the camming action of a screw thread will, under vibration, cause a screw to become loose and to back out of a tapped member. To overcome this action to some extent it has been necessary to hold a very limited tolerance between the screw thread and the tapped member and while this is a costly operation its effectiveness is not assured. Another general practice has been to secure a screw in a tapped hole by means of superimposing a so-termed jamb-screw after the first screw has been positioned. This is in accordance with the check nut theory. This practice is not advantageous when it is desired to obtain a required adjustment of the first screw as the tightening of the jamb-screw has a tendency, when it comes in contact with the first screw, to rotate and tighten the first screw. It is also possible for the above camming action to cause both screws to become loose. In the application of this practice it is often necessary to use a larger diameter jamb-screw which requires an additional drilling and tapping operation.

To overcome the above disadvantages my locking device is contained permanently within the screw as is best illustrated by a fillister or headless screw wherein a screwdriver is inserted into a slot to rotate the screw. When the screw-driver is inserted into the screw slot, the locking device is actuated and disengaged from the internally threaded member. As the screw-driver is withdrawn from the screw slot my locking device automatically engages with the threaded portion of the internally threaded member thereby locking the two members in position thus preventing further relative rotary motion between the two members.

The object of my present invention is to provide a self-contained locking screw that may be positioned in a tapped member and when so positioned further relative rotary movement is arrested.

With the above and other objects in view my invention consists in a novel combination and arrangement of parts hereinafter described and more specifically pointed out in the appended claims.

In the accompanying drawings I have illustrated my device sufficient to enable those skilled in the art to understand the construction and operation thereof.

Referring to the drawings:—

Fig. 1 is a vertical section of a fillister head screw having my locking device contained therein.

Fig. 2 is a view corresponding to Fig. 1, but shows the locking device in a different position.

Figs. 3 and 4 are modifications of my locking device.

Fig. 5 shows my locking device contained in a headless socket screw.

In the drawings I have shown a member 10 having an opening 11 internally threaded to receive the threaded portion 12 of the screw body 13. The screw is provided, in this instance, with an enlarged head 14 having a transverse slot 15 adapted to have inserted therein a screw-driver 16.

The body portion 13 of the screw is provided with a chamber 17 which connects with the slot 15 thru a communicating opening 18 which is of a less diameter than the chamber 17.

Slidably mounted in the chamber 17 is the enlarged portion 19a of the plunger 19 which extends thru the opening 18 and into the slot 15. The lower portion 19b of the plunger engages a resilient transverse member 20 the ends of which have their bearings in oppositely disposed openings 12a extending thru the walls of the threaded portion 12 of the screw. This resilient transverse member 20 is normally of greater length than the outside diameter of the thread. At Figs. 1 and 2, a spring 21 is shown encircling the lower portion 19b of the plunger, one end of said spring has its bearing against the resilient member 20, the opposite end of said spring bearing against the enlarged portion 19a of the plunger thus retaining the plunger in its normal inoperative position, as shown at Fig. 1, and permitting the resilient transverse member 20 to engage with the internal threads in the member 10.

At Fig. 2 the plunger 19 is shown depressed by a screw driver 16 thus actuating the member 20 and retracting the ends of said member from engagement with the internal threads of the member 10.

At Fig. 3 I have shown a modification of the resilient transverse member 22 which has a substantially U shaped section with lateral extending ends projecting thru the openings 12a, in the threaded portion 12 of the screw, and normally engage with the internal threads of the member 10. The member 22 is actuated by the plunger 19 as above described.

Fig. 4 illustrates a further modification, the resilient member 23 being provided with a coil the oppositely disposed ends of which project thru the openings 12a and normally engage with the internal threads of the member 10. The member 23 is actuated by the plunger 19 as previously mentioned.

At Fig. 5, I have shown my locking device as applied to a headless screw 24. In this particular instance the outer end of the screw is provided with an opening 25 adapted to have inserted therein a wrench, 26. As the wrench 26 is inserted in the opening 25, the plunger 27 is depressed thus actuating the resilient member 28 and disengaging the ends of said member from engagement with the internal threads of the member 29.

Having thus described my invention it will be evident that numerous changes and modifications may be made therein by those skilled in the art without departing from the spirit and scope thereof, therefore I do not wish to be limited to the specific details disclosed, but what I claim is:—

1. An externally threaded element, an internally threaded element, resilient means contained within said externally threaded element and normally extending therefrom to engage the threads of said internally threaded element to prevent relative rotary movement between the two said elements, means operable to retain said resilient means out of engagement with the threads of said internally threaded element.

2. An externally threaded element, an internally threaded element, a resilient transverse member supported in said externally threaded element and normally extending therefrom to engage the threads of said internally threaded element to prevent relative rotary movement between the two said elements after the elements have been relatively positioned, coacting means to retain said transverse member inoperative during the positioning of the two said elements.

In testimony whereof I have hereunto set my hand.

ERNEST R. LLEWELLYN.